Dec. 3, 1968     K. W. McLOAD     3,414,874

SEISMIC SURVEY SYSTEMS

Filed Feb. 24, 1967

Kenneth W. McLoad
INVENTOR.

BY John E. Holder

ATTORNEY

United States Patent Office 3,414,874
Patented Dec. 3, 1968

3,414,874
SEISMIC SURVEY SYSTEMS
Kenneth W. McLoad, Houston, Tex., assignor to Schlumberger Technology Corporation, Houston, Tex., a corporation of Texas
Filed Feb. 24, 1967, Ser. No. 618,383
6 Claims. (Cl. 340—7)

ABSTRACT OF THE DISCLOSURE

A marine seismic cable system, which is provided with a plurality of transducers arranged along its length, is towed behind a ship for conducting a seismic survey. The transducers are constructed so that upon energization by shipboard apparatus, they act as individual sound sources which when arranged in the elongated configuration of a cable provide an elongated, cylindrical acoustical source. The same transducers are also adapted to receive acoustical energy reflected from subsurface earth formations and transmit a signal indicative thereof to a recording apparatus aboard the ship.

Background of the invention

This invention relates to a method and apparatus of seismic prospecting for geological structures disposed beneath a body of water and pertains more particularly to a method and apparatus for generating seismic acoustical energy in the form of pressure waves and for receiving subsurface reflections thereof. It is a common practice in geophysical exploration for oil to tow over the water-covered survey area a submerged electrical cable containing a plurality of devices which respond to pressure waves in the water. Such pressure waves are most commonly generated within the water by explosives or by vibratory means. The pressure waves are propagated downwardly and outwardly from the source of seismic disturbance. Those waves passing downwardly will traverse the water and subsurface formations of the earth underlying the water. As the waves encounter changes in the nature of those formations traversed, a portion of the energy in the waves will be deflected upwardly and will be received by the pressure responding devices carried by the electrical cable. The reflected waves are received by the pressure responsive device at a time measured from their emission which is indicative of the depth from which they are reflected. Thus, a repetition of this process and subsequent measure of such time repeated at many locations of an area will allow deduction as to the depth and the attitude of such formations which may contain traps favorable to the accumulation of oil.

A commonly employed method and apparatus for surveying geological formations in water-covered areas is described in U.S. Patent No. 2,465,696 to L. C. Paslay. In this method, seismic signals are initiated from an explosive charge lowered into a body of water from a moving vessel and fired by a control means from the vessel when the vessel has proceeded along a predetermined course for a distance sufficient to cause a flexible elongated streamer having a plurality of piezoelectric seismometers arranged at intervals therein to be positioned above or to one side of the explosion. The pressure applied to seismometers by the surrounding water in response to seismic signals reflected from subsurface formations in the earth beneath the explosion causes voltage signals to be generated by the seismometers corresponding respectively to the seismic signals received thereby. These electrical signals are amplified and recorded on a moving tape or chart on the vessel in time-spaced relation with respect to a start signal recorded thereon. As the firing circuit for the initial explosion is closed, the exact geographical location of the survey is determined. A precision navigation positioning system may be used which directs and permanently records the geographic location of the vessel at all times while the survey is underway.

The acoustic pressure waves which are reflected from earth formations travel upwardly toward the surface of the water. At the surface, because of the great density contrast between water and air, these waves are reflected back downward, with phase reversal occurring because the acoustic waves are in the more dense medium (water) of the interphase. It follows then that acoustic pressures are a minimum at the water surface and that surface reflected downward pressures will interfere with upward traveling pressure waves, except when the detectors are at a suitable depth. Therefore, pressure actuated detectors need to be about one-quarter wave length or odd multiples thereof below the surface for best reception. The record quality improves dramatically as detectors are deepened from the surface as deep as forty to sixty feet, since most deep strata seismic information is in the twenty to fifty cycle-per-second range. For similar reasons, the source of acoustical energy is more effective when located at these same depths below the surface of the water.

If an explosive is used as the sound source, an undesirable affect is created by placing the explosive at one-quarter wave length depths beneath the surface of the water. The initiation of an explosive in water creates a primary pressure pulse in the water. The seismic signal is derived from the initial pressure pulse or wave resulting from the explosion. Normally, objectionable secondary pressure pulses also are generated subsequent to the initial pressure pulse. The secondary pressure pulses are caused by oscillation, that is, by contraction and expansion, of a gaseous bubble generated as a result of the explosion. The bubble is formed from hot gases which results from the explosion and which expands against the pressure exerted by the water at the depth at which the explosion is initiated. As the bubble expands, its internal pressure decreases until equilibrium is reached between the pressures inside and outside the bubble. However, since the water being moved by the bubble has a great mass traveling outwardly, the water and bubble will tend to overexpand so that the pressure within the bubble is less than within the water. Eventually, the bubble begins to collapse until it is stopped by the highly compressed gas in the bubble which is now of a smaller volume. At the minimum of bubble volume, the gas pressure is large enough to generate an acoustical pulse which is known as a secondary pressure pulse. The expansion-contraction cycles continue in decreasing intensity until the bubble energy has been dissipated to the surrounding water. Since the bubble is buoyant, it will tend to drift upwardly toward the surface while it is resonating in the water. Therefore, if placed near the surface, the bubble will break into the air before a secondary pulse is generated.

The secondary pressure pulses are objectionable in that they are reflected from subsurface interfaces in a manner similar to that of the primary pulse, and the arrival of the reflected secondary pressure pulse tends to mask or obscure desired events on the seismic record. Furthermore, the secondary pulses may be directly transmitted to the recording system at the same time as the reflected primary pulse arrives, thereby further confusing the record. Therefore, although it is desirable to have the sound source located one-quarter wave length below the surface or odd multiples thereof, such location when using an explosive produces the undesirable secondary pressure pulses.

Dynamite as a sound source has several drawbacks including its inherent hazard as an explosive and damage to marine life. Also, dynamite is very expensive in the quantities used for seismic prospecting. When exploded underwater, dynamite generates a comparatively large underwater force which is non-directional, that is, the energy is not channeled in any particular direction but rather radiates from the source in all directions. Therefore, it is readily seen that most of the acoustical energy released by such an explosion does not create a useful seismic pulse.

Additionally, such an explosive seismic source generates acoustical waves containing frequencies over a large spectrum. However, due to the filtering effect of the earth's layers, reflected seismic signals carrying useful information are generally in the twenty to fifty cycle-per-second frequency range. Thus, much of the acoustical energy generated by such an explosive sound source is of a frequency that will not be returned in the form of a reflected seismic wave.

It is, therefore, an object of the present invention to provide a new and improved method and apparatus for initiating and receiving acoustical energy in a marine seismic surveying system.

Summary of the invention

The present invention utilizes a unitary marine cable which includes a transducer system for generating a seismic impulse and for receiving reflected seismic pressure waves. Energy from shipboard means is provided to a plurality of transducers in an elongated array to initiate the emission of a sound wave, such energy being supplied to the transducers either in unison or in a sequential manner. Such a configuration provides a highly directional energy source in the form of an elongated cylinder. In addition, the transducers are alternately connected to such energizing means and to recording devices for recording reflected seismic signals detected by the transducers, again, either in unison or in a sequential manner. Alternatively, separate transducers may be utilized for emitting and receiving seismic energy to take advantage of the operational characteristics of transducers as being best suited for either emitting or receiving.

In addition, to the single elongated cable array, several cable arrays, each including a transducer system, may be laterally spaced and towed behind a ship as a single system to further improve the directional characteristics of the system.

The novel features of the present invention are set forth with particularity in the appended claims. The present invention, both as to its organization and manner of operation together with further objects and advantages thereof, may best be understood by way of illustration and example of embodiments when taken in conjunction with the accompanying drawings.

Brief decsription of the drawings

Description of the preferred embodiments

Figure 1:
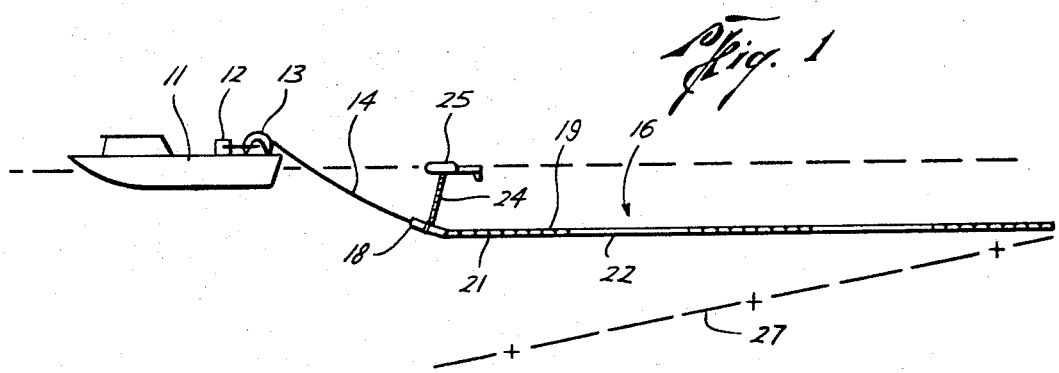
FIGURE 1 is a schematic view showing the relative positions of a towing vessel and a marine seismic surveying system in accordance with the present invention.

Referring first to FIGURE 1, a towing vessel 11 is shown having a cable reel 13 mounted on the stern thereof for letting out or reeling in a lead in or tow cable 14 to which is connected a streamer 16. Any suitable type of weighting device 18 is secured to the leading end of the cable 16 so as to maintain it at a predetermined depth in the water. Normally, the cable 16 has a neutral buoyancy so that it will stream out behind the weighting device 18 in a horizontal position at a constant depth in the water. A faired tether line 24 is shown extending upwardly from the leading end of the streamer with its upper end being attached to a minimum drag surface buoy 25 to further provide for depth control of the system. It is appreciated that several of the surface buoys, connecting tether lines, and weights may be spaced along the length of the streamer for more positive depth control. The streamer is comprised of a flexible cable having a plurality of seismic transducers mounted therein or thereon in spaced relationship along the length of the cable. As shown in FIGURE 1, the cable may be comprised of active sections 19 which contain a plurality of spaced transducers 21 and inactive sections 22 which are spaced between the active sections to elongate the array.

Normally, when such a streamer is used for seismic surveying, a second vessel is used to position an explosive charge approximately midway along the length of the cable at a depth of approximately three or four feet below the surface so that a gas bubble generated by the explosion breaks to the surface on its first expansion. Such explosive charge, of course, provides a source of seismic energy which, when reflected from underlying subsurface formations is reflected and received by the transducers in the cable to provide information as to the depth, slope and other characteristics of the subsurface formations.

In accordance with the present invention, however, the use of a high explosive charge has been eliminated by providing transducers 21 in the cable system which may be operated as both emitters of seismic energy and receivers of seismic energy. For example, it is commonly known that piezoelectric devices generate electrical signals in accordance with seismic acoustic reflections due to crystals therein being stressed by the acoustic pressures through bending, twisting or hoop compression. At the same time, such piezoelectric devices when energized with an electrical signal will conversely emit a pressure wave through the same bending, twisting or hoop compression of the crystal. In addition, such devices may be constructed to emit acoustical energy at a particular frequency or range of frequencies.

Other types of transducer devices will also operate as both emitters and receivers such as magnetostrictive devices which have elements that vary their magnetic permeability with physical stress. Thus, conversely by applying electrical energy to vary the magnetic permeability of the element, a physical stress is induced which generates an acoustic pressure wave.

It is readily appreciated that the amount of total energy which may be imparted by a dynamite source into the water is large as compared with the amount of energy which may be imparted by one or more pressure transducers such as have been described above. However, emission of acoustical pressure waves from a directive array of emitters as shown in FIGURE 1, would, if cophasally excited, direct energy two dimensionally rather than nondirectionally, with consequent increase in the efficiency of emitter energy as regards its being sent more concentrately toward the reflecting formations. By connecting the transducers 21 in each of the sections 19 in parallel, when excited by an electrical pulse, they would produce a substantially elongated cylindrical acoustical pressure wave which would be highly directional and which could either be a pulsed or vibratory emission. Following the emission and pending receipt of the reflections of the seismic waves, suitable means 12 on board the ship disconnect the excitative means and connect receptive shipboard equipment for amplifying, filtering and recording the seismic signal in a well-known manner to gather useful information on the subsurface formations.

In addition to the desirable directionality of the acoustical emissions from such an elongated array, the transducers are also designed to emit energy at a frequency capable of penetrating the ocean floor and reaching subsurface formations for reflection back to the transducers. Therefore, while the total energy emitted by such a system may be low as compared to such sources as dynamite, the use of selected frequencies and directional emission increases the efficiency of such a sound sources to an extent that the resolution and depth of the recorded signals is satisfactory for seismic operations.

Certain exploration problems may find a preferred solution in the emission and reception of energy at some angle other than vertically from the elongated sound source. For example, such an exploration problem might exist where it is desirable to derive reflections from a formation having a very steep dip. Such directional emission may be accomplished by introducing phase differences in the excitation of successive sections or informational channels of transducers. For example, suppose that the group of transducers in the section 19 nearest the boat emits a wave first, the next channel or section a bit later, and so on to the last channel. As shown in FIGURE 1, the pressure wave produced by the transducers in each section while generally traveling in a line parallel to the section, will convene with pressure waves from adjacent sections to form an angularly directed traveling wave front 27. Similarly, phase shifting of the receiving circuits will produce preferred directional response from the reflecting surfaces as the seismic signals are recorded by shipboard equipment. Of course, the same effect may be produced at a later time by introducing such phase shifting in computer equipment which is used to refine and analyze the seismic information. The emitted wave which is shown directed to the aft in FIGURE 1 may also be directed forwardly at a desired angle by proper choice of phase difference and sequence of the excitation of the transducer sections.

Figure 2:
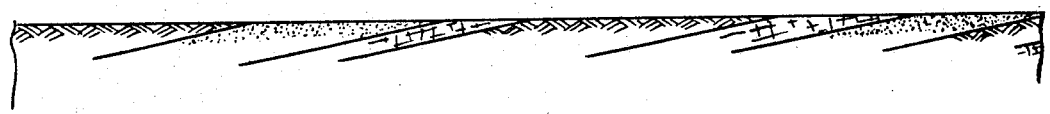
FIGURE 2 is a schematic view of an alternative embodiment of a marine seismic surveying system in accordance with the present invention.
Figure 2:
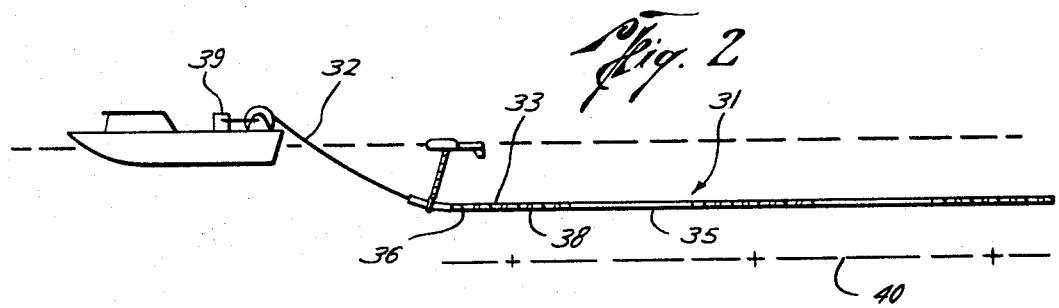

Although desirable, it is not essential that the functions of emitting and receiving be incorporated in the same transducer, since emitters of one nature and receptors of another might be contained within the same deployed cable system so that the advantages of different transducers as to their capabilities for sending or receiving might be utilized. Such a system is shown in FIGURE 2 where a streamer 31 is shown connected to a boat or vessel by means of a tow cable 32. The streamer has active sections 33 separated by inactive sections 35. First transducers 36 are arranged in the cable in a spaced relationship and serve as emitters of seismic energy. Second transducers 38 are spaced between transducers 36 and serve as receivers of seismic energy. All of the transducers in a section 33, both emitters and receivers, may be connected to a common conductor with appropriate circuit means being provided to connect and disconnect the conductor with excitation and recording means 39, respectively, on board the vessel. As shown in FIGURE 2, if all of the emitting transducers 36 are connected in parallel and excited simultaneously, a wave front 40 traveling parallel to the elongated array will be discharged upon such excitation of the emitting transducers. This pressure front will radiate from the streamer in a cylindrical fashion or when phase differences are introduced in a conical fashion, with uniform effectiveness radially but with a greatly reduced effectiveness longitudinally.

Figure 3:
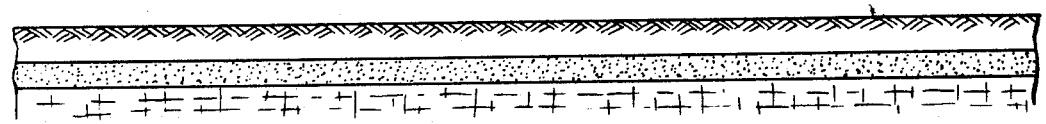
FIGURE 3 is a perspective view of a marine seismic surveying system having laterally spaced cable members positioned behind a towing vessel.
Figure 3:
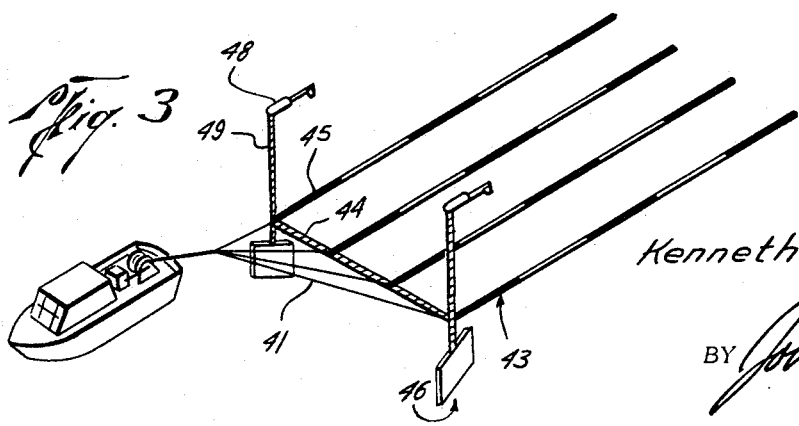

Referring next to FIGURE 3, a cable system is shown which consists of a number of linear cables deployed laterally and parallel to one another. Such a configuration provides directivity in two axes, effectively emitting and receiving signals vertically or in controlled directions from the vertical. Means for towing a multiplicity of linear cables laterally deployed consists of a plurality of towing cables 41 connecting the towing vessel with the leading ends of the streamer arrays 43. Each of the streamers has a plurality of sections 45 with transducers therein for receiving reflected seismic waves. A lateral connecting cable 44 connects the leading ends of the cable arrays to one another. Paravanes 46 are positioned at the leading ends of the two outside cable streamers to pull in opposite lateral directions against the system and thereby maintain lateral spacing between the streamers. Surface buoys 48 are connected to the leading ends of the outside streamers by means of faired tether lines 49. Weights are provided at the leading ends of the outside streamers. This system is arranged similarly to the streamers of FIGURES 1 and 2 to provide depth control so that the system may be towed at odd multiples of one-quarter wave lengths below the surface.

It is readily seen that the directional characteristics of a streamer system may be greatly enhanced by the arrangement shown in FIGURE 3, the streamer system being particularly sensitive to vertically traveling waves and with reduced sensitivity to waves traveling longitudinally and transversely to the system. In addition, phase shifts may be introduced into signals generated by the receiving transducers to provide for increased sensitivity of reception at an angle to the vertical.

Again, the transducers in the streamers or at least a portion thereof may be capable of emitting acoustical energy upon electrical excitation. In the configuration shown in FIGURE 3, such a seismic wave emitting from the individual sections will convene with adjacent sections to form a generally vertically traveling wave front having greatly reduced effectiveness longitudinally and transversely so that still an even greater amount of energy produced by the system will be effectively concentrated toward underlying surface formations. As with the system of FIGURE 1, the wave front emitting from the apparatus of FIGURE 3 may be directed angularly from the vertical but with additional lateral control in the latter system by phase shift between lateral streamers.

It is readily seen that many of the disadvantages cited in prior systems are overcome by the cable system described herein. For example, the directionality of both received and emitted signals provides for more effective use of energy in the system. Also, the sound source may now be placed at a depth below the surface so that the wave reflected from the surface will reinforce the wave traveling toward the subsurface formations. That is, the sound source may now be located at a depth corresponding to one-quarter wave length of the reflected energy or odd multiples thereof below the surface. In addition, a single system is deployed behind the vessel and provides means for both emitting the seismic sound source and receiving reflected sound signals. Since one transducer may be used for both emitting and receiving, it is readily appreciated that the cost of such system would be substantially less than that of other systems used for seismic explorations. Of course, the well known advantages of using nondynamite sources for generating pressure waves is inherent in the system, that is, safety, nondestruction of marine life, etc.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A method of seismic prospecting for geological structures disposed beneath a body of water, comprising the steps of: deploying in said body of water an elongated cable member having a plurality of spaced transducers distributed along its length; energizing each of said plurality of spaced transducers to emit a directionally controlled acoustical wave front; detecting an electrical signal resulting from a reflected acoustical wave front impinging upon each of said plurality of spaced transducers; and recording said detected electrical signal.

2. The method of claim 1 wherein the steps of energizing and detecting are alternated on each of said spaced transducers for alternately generating a seismic wave emission and recording reflected seismic signals.

3. The method of claim 1 wherein the step of energizing each of said plurality of spaced transducers to generate seismic waves is performed in timed sequence and thereby produces an angularly directed, elongated acoustical wave front.

4. The method of claim 3 wherein the step of recording consists of sequentially delaying the recording of signals generated by the reception of seismic waves at each of said plurality of spaced transducers to produce recorded signals cophasal in time.

5. A seismic cable system for use in prospecting for geological structures disposed beneath a body of water, including: a plurality of laterally spaced, parallel, elongated, cabe members arranged for towing as a unitary system behind a boat, each of said cable members carrying a plurality of spaced, signal generating and detecting seismic transducers; and means for maintaining said cable members laterally spaced from one another in the water.

6. The cable system of claim 5 wherein; the transducers carried by said plurality of parallel cable members are arranged in a matrix to define transducer arrays along lines which are at an angle relative to the direction of the cable members, thereby permitting acoustical wave fronts to be oriented in selected vertical planes, either parallel to, or at angles to said cable members.

References Cited

UNITED STATES PATENTS

| | | | |
|---|---|---|---|
| 3,290,644 | 12/1966 | Hoskins | 340—7 |
| 3,304,533 | 2/1967 | Huckaby et al. | 340—7 |

RODNEY D. BENNETT, *Primary Examiner.*

C. E. WANDS, *Assistant Examiner.*